Sept. 29, 1953  E. V. COLLINS  2,653,531
PLOW HITCH

Filed June 3, 1950  4 Sheets-Sheet 1

INVENTOR.
Edgar V. Collins
BY
Rudolph L. Lowell
Atty.

Sept. 29, 1953 — E. V. COLLINS — 2,653,531
PLOW HITCH
Filed June 3, 1950 — 4 Sheets-Sheet 2

INVENTOR.
Edgar V. Collins
BY Rudolph L. Lowell
atty.

Sept. 29, 1953  E. V. COLLINS  2,653,531
PLOW HITCH
Filed June 3, 1950  4 Sheets-Sheet 3

INVENTOR.
*Edgar V. Collins*
BY
*Rudolph L. Lowell*
Atty.

Sept. 29, 1953 E. V. COLLINS 2,653,531
PLOW HITCH
Filed June 3, 1950 4 Sheets-Sheet 4
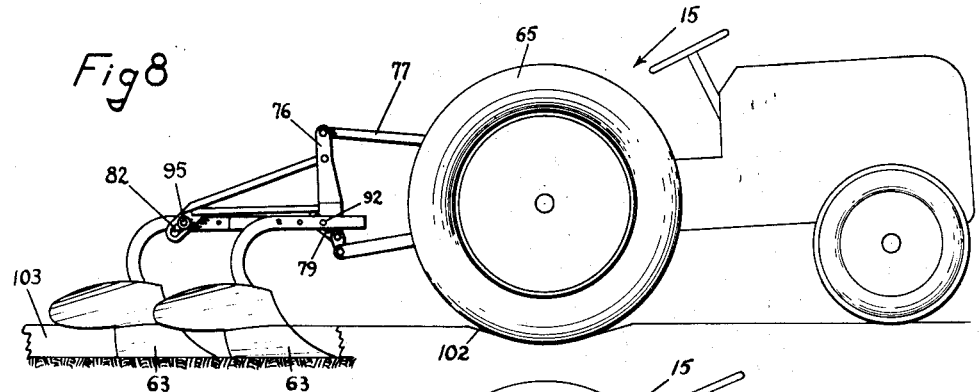
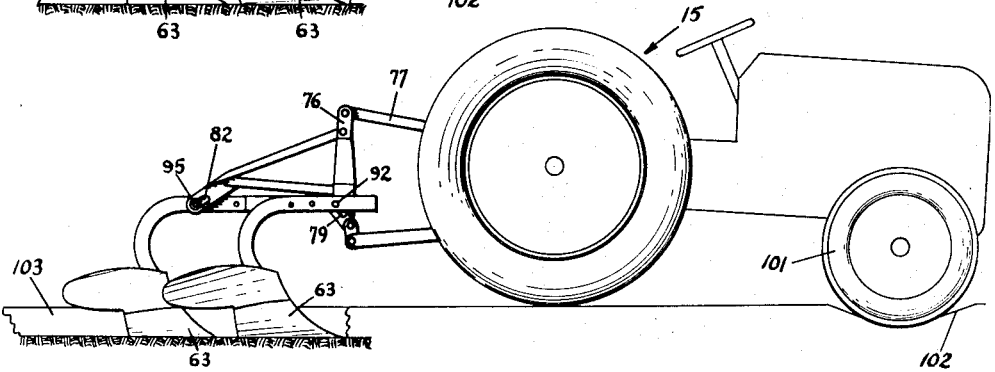
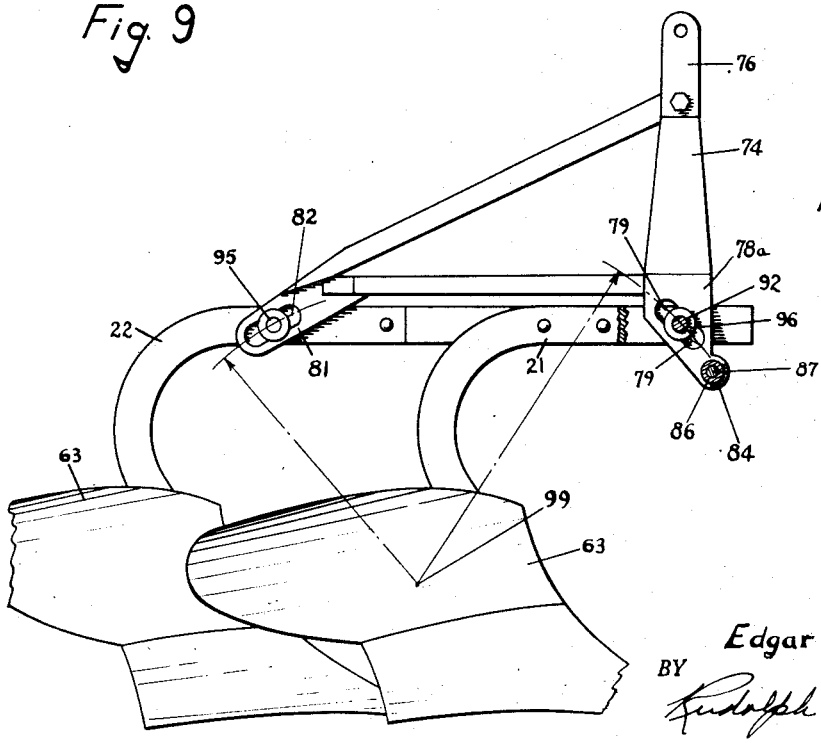
INVENTOR.
Edgar V. Collins
BY
Rudolph L. Lowell
Atty.

Patented Sept. 29, 1953

2,653,531

UNITED STATES PATENT OFFICE 2,653,531

PLOW HITCH

Edgar V. Collins, Ames, Iowa

Application June 3, 1950, Serial No. 165,922

10 Claims. (Cl. 97—47.53)

1

This invention relates generally to tractor hitches and in particular to a hitch for connecting a farm tractor with a ground working farm implement such as a plow, cultivator, lister, and the like.

In the general use of a ground working farm implement, such as a plow, for example, appreciable difficulty is encountered in contour plowing, or plowing requiring short radius turns, due to the inability of the plow to follow the tractor in the turn. This objection is generally the result of the side thrust of the plow acting to limit the effective turning action of the tractor steering wheels, so that the side thrust takes the steering of the tractor away from the tractor steering wheels in a short turn. In other words, after the tractor has been turned to a certain point, any further steering action is ineffective to accomplish any sharper turning radius due to the steering wheels being merely pushed or skidded in a turn having a radius greater than that called for by the turned position of the steering wheels. Further evidence of this condition is found in the fact that the width of the cut made by the plow in the turn, is of a different width relative to the cut made by the plow during the straight advance of the tractor.

It is an object of this invention, therefore, to provide for an improved tractor hitch.

A further object of this invention is to provide a tractor hitch for a ground working implement which maintains a substantially uniform width of cut in both a straight line and short turn operation of the tractor.

Another object of this invention is to provide a tractor hitch for a plow capable of controlling the action of the plow so as to maintain the depth and width of the plow cut substantially uniform for an operation of the tractor in an arcuate path over an uneven or irregular ground surface.

Another object of this invention is to provide a hitch for connecting a plow with a tractor which is capable of controlling the suction of the plow so that the depth of the furrow being cut by the plow is substantially uniform for a travel of the tractor over an uneven ground surface.

Another object of this invention is to provide a hitch for connecting a plow with a tractor such that a part of the usual side thrust on the land side of the plow is transferred to the tractor wheels, whereby to permit a plowing

2 operation within a shorter turning radius than has, so far as is known, been possible heretofore.

Further objects, features, and advantages of this invention will become apparent from the following description when taken in connection with the accompanying drawing in which:

Figs. 8 and 9 are diagrammatic side elevational views of the plow hitch of Fig. 6 shown in assembly relation with a tractor; and Fig. 10 is a side elevational view illustrated similarly to Fig. 7.

Figures 1, 2:
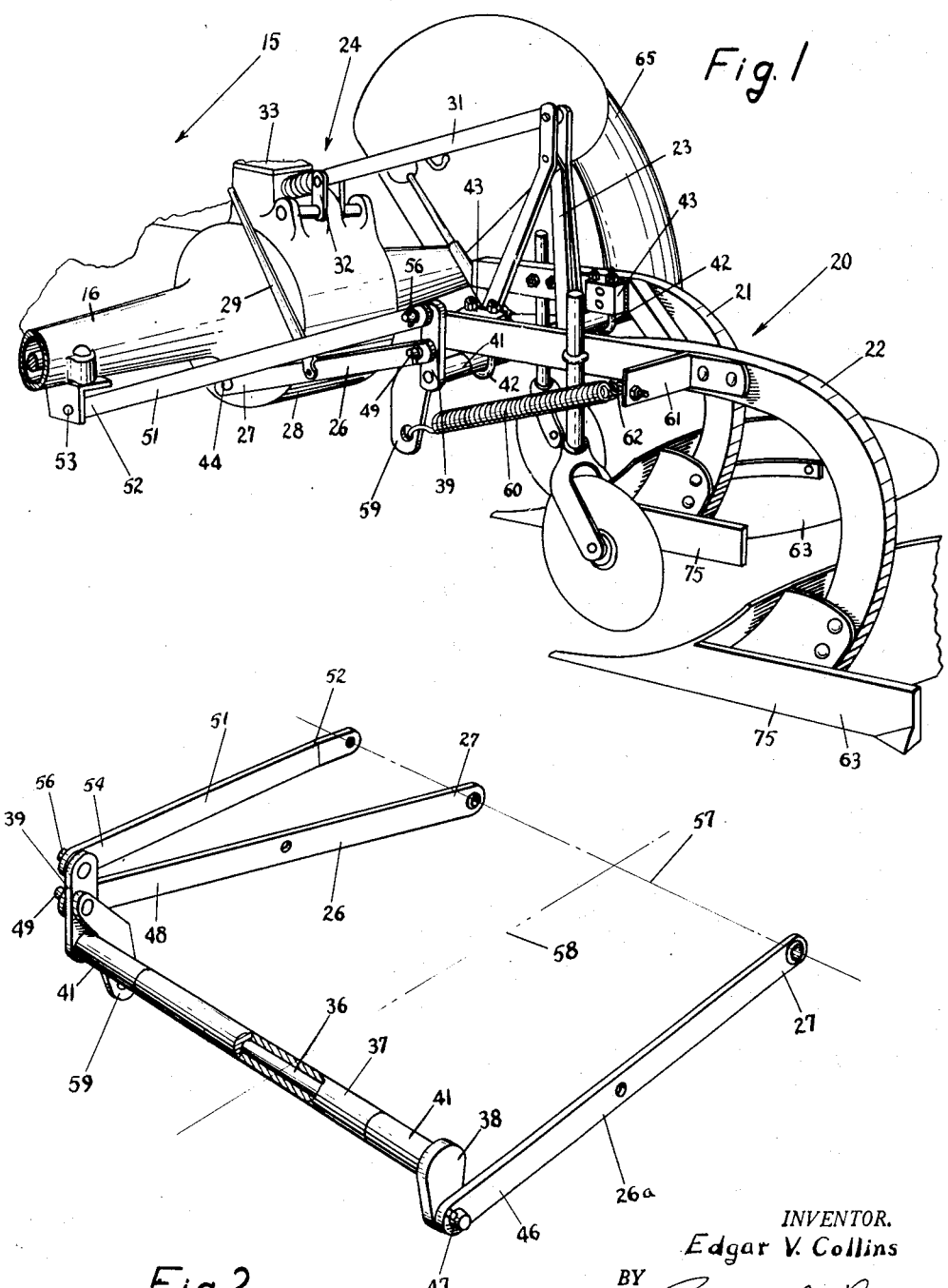
Fig. 1 is a perspective view of the plow hitch of this invention shown in assembly relation with a tractor equipped with a Ford hydraulic power unit.
Fig. 2 is a detail perspective view of the plow hitch, with certain parts broken away to more clearly show its construction.

With reference to the drawings the hitch of this invention is illustrated in Fig. 1 in assembly relation with a tractor, designated generally as 15, having a rear axle 16, and a plow structure, designated generally as 20 including a pair of inter-connected plow beams 21 and 22 and an upright frame 23.

The tractor illustrated is a Ford, equipped with a hydraulic power unit 24 of a well known type, and having a pair of draft arms 26 and 26a with their front ends 27 swively connected at 44 to opposite sides of the differential housing 28. Lift links 29 are connected with the draft arms 26 and 26a and with a pair of rock arms (not shown) which are actuated, on operation of the power unit 24, to lift the draft arms 26 and 26a whereby to raise and lower the plow structure 20 relative to the ground. A link 31 is pivoted at one end to a bell crank 32, and at its opposite or rear end to the upright frame 23 on the plow structure 20. The bell crank 32 is operatively associated with a valve mechanism 33 so that when the draft on the plow or farm implement varies tending to tilt the implement toward the tractor, the power unit 24 is actuated to raise the plow structure from the ground.

The hydraulic power lift 24 briefly discussed above is well known commercially and except for the utilization of the draft arms 26 and 26a forms no part of the present invention.

The hitch of this invention (Figs. 1 and 2) includes a rock shaft 36 which is carried in a tubular bearing 37. Secured, as by welding, to opposite ends of the rock shaft 36 are a pair of rock arms 38 and 39 which are relatively positioned so as to extend laterally outwardly in opposite directions from the rock shaft 36. Located between each rock arm 38 and 39 and an adjacent end of the tubular bearing 37 is a spacing collar 41.

As best appears in Fig. 1 the rock shaft and rocker arm assembly is extended transversely of the plow structure 20, at a position adjacent the front end thereof, and is secured to the plow beams 21 and 22 by means of U-clamps 42 extended about the tubular bearing 37 and carried in suitable brackets 43 mounted in an oppositely arranged relation on the plow beams 21 and 22.

As previously mentioned the front ends 27 of the draft arms 26 are swivelled, as indicated at 44 in Fig. 1, to opposite sides of the differential housing 28, such that the connections 44 are in linear alignment transversely of the tractor 15. The rear end 46 of the draft arm 26a is swivelled adjacent the free end of the rock arm 38 on a swivel pin 47 extended laterally outwardly from the rock arm 38 in a parallel relation with the rock shaft 36. The rear end 48 of the draft arm 26 is swivelled on the rock arm 39, at a position intermediate the ends thereof, on a swivel pin 49 projected laterally outwardly from the rock arm 39 in a parallel relation with the rock shaft 36. It is seen, therefore, that the pins 47 and 49 on the rock arms 38 and 39, respectively, are at opposite ends of the rock shaft 36.

A stabilizing or actuating arm 51, illustrated as being of a longer length than the draft arms 26 and 26a (Figs. 1 and 2), has its front end 52 swivelly connected at 53 on the tractor rear axle 16 at a position spaced outwardly from the draft arm 26. The rear end 54 of the stabilizing arm 51 is swivelled adjacent the free end of the rock arm 39 on a swivel pin 56 projected outwardly from the rock arm 39 in a parallel relation with the pivot pin 49. The swivels 44 for the front ends of the draft arms 26 and 26a, and the swivel 53 for the stabilizing arm 51, are in linear alignment transversely of the tractor 15, as indicated by the line 57 in Fig. 2 whereby the arms 26, 26a and 51 are movable in an up and down direction about a common axis and transversely of the tractor 15. Further, the draft arms 26 and 26a are symmetrically arranged relative to a medial line 58 extended transversely of the rock shaft 36 at a center position between the rock arms 38 and 39.

The rock arm 39 (Figs. 1 and 2) is provided with an extension arm 59 extended laterally from the rock shaft 36 in the same direction as the rock arm 38. When the rock shaft 36 is assembled on the beams 21 and 22, the rock arm 39 is positioned outwardly from the beam 22, while the rock arm 38 is positioned outwardly from the beam 21. The beam 22 carries an outwardly extended lateral bracket or projection 61 which is located rearwardly of the rock arm 39 and in turn rearwardly of the extension arm 59. A coil spring 60 is connected in tension to the free end of the extension arm 59 and to the bracket 61, with an adjusting screw 62 at the bracket 61 providing for a variation in the tension of the spring 60. The pressure of the spring 60 acting on the rock shaft 36 effects a continuous yieldable bias on the rock shaft tending to rotate the rock shaft in one direction of rotation thereof. This pressure applied by the spring 60 on the rock shaft 36 acts to offset or counter balance the side thrust produced on the land side 75 of the plow 63 carried on the beams 21 and 22, and which side thrust tends to move the plows 63 into the furrow wall, or toward the left as viewed in Fig. 1.

In the operation of the hitch of this invention assume the tractor to be moving forwardly in a straight path. For this advance of the tractor 15 the plow structure 20 is in a direct following relation with the tractor, as illustrated in full lines in Fig. 3, and the draft arms 26 and 26a are in a symmetrical arrangement relative to the longitudinal axis of the tractor or the medial line 58 shown in Fig. 2. This full line position of the plow structure 20 in Fig. 3 corresponds to its showing in Fig. 1, wherein it is seen that the rock arm 39 is in a substantially vertical upright position and the extension arm 59 is projected downwardly. From a consideration of Fig. 2 it is apparent that the rock arm 38 in turn is projected vertically downward.

Figure 3:
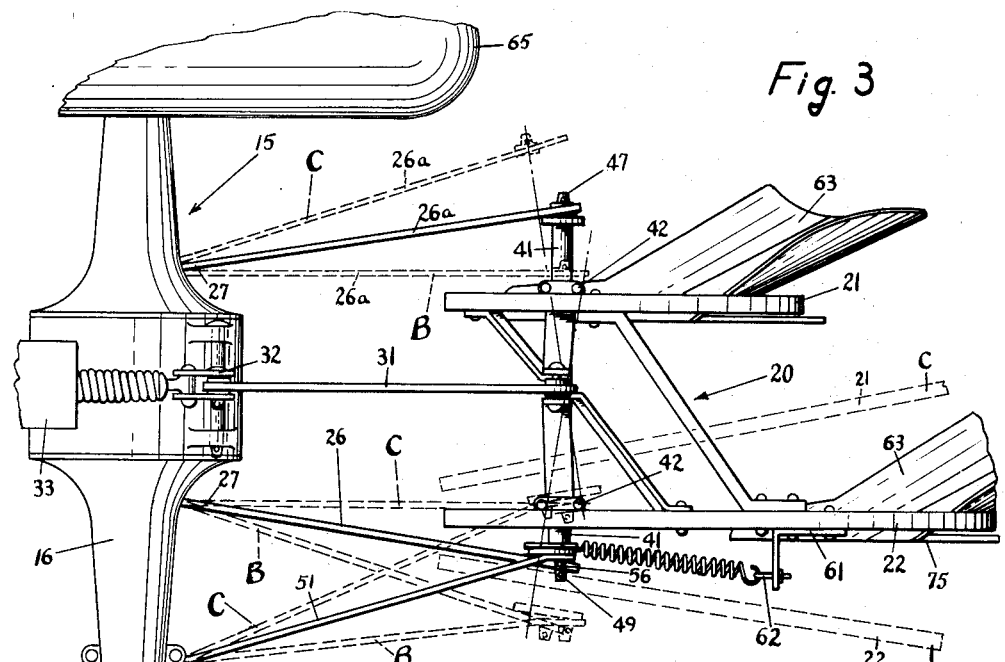
Fig. 3 is a plan view of the assembly shown in Fig. 1.

When the tractor 15 is turned to the left the draft arms 26 and 26a and stabilizing arm 51 are moved from their full line positions shown in Fig. 3 to their dotted line positions indicated at B in Fig. 3, namely, to positions inclined rearwardly from their front ends toward the left side of the tractor.

Figure 4:
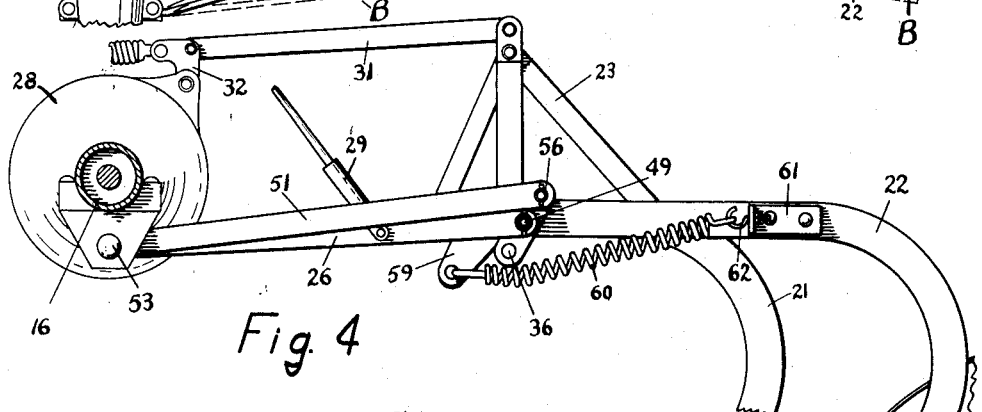
Fig. 4 is a side elevational view of the plow hitch shown in one moved position therefor.

With this movement of the arms 26, 26a and 51 in the direction of the left hand turn, the plow structure 20 is moved so as to be pointed toward the right side of the tractor 15, as illustrated at B by the beam 22 in Fig. 3, whereby the plows 63 are steered in a following relation relative to the turning arc or radius of the tractor. Concurrently with the movement of the arms 26, 26a and 51 to their left hand turn positions indicated in dotted lines at B in Fig. 3, the rock shaft 36 is rocked in a clockwise direction, as viewed in Fig. 1, to its position shown in Fig. 4 whereby to increase the pressure exerted by the spring 60. However, since this rocking movement of the shaft 36 provides for the movement of the extension arm 59 upwardly and forwardly from its substantially upright position shown in Fig. 1, the effective moment arm of the spring 60 relative to the axis of the rock shaft 36 is reduced relative to its effective moment arm when the extension arm is in its downward position shown in Fig. 1. As a result, the force applied on the rock shaft 36 by the spring 60 to counter balance a part of the side thrust produced by the plows 63 remains substantially constant.

It is seen, therefore, that the movement of the plow structure 20 in a direction transversely of the tractor 15 and away from the furrow wall for a left hand turn maintains the plow structure in a following relation with the tractor in the turn whereby the width of cut made by the plows 63 in a lefthand turn is substantially equal to the width of the cut made by the plows for a straight path advance of the tractor 15.

Referring to Figs. 1 and 2, in which the rock arms 38 and 39 are shown in positions for a straight line advance of the tractor, it is seen that the rear end 46 of the draft arm 26a is located below the rock shaft 36, while the rear end 48 of the draft arm 26 is positioned above the rock shaft 36. In a lefthand turn of the tractor the movement of the rock arm 39 to its position shown in Fig. 4 takes place by virtue of the fact that the connections 49 and 56 for the draft arm 26 and stabilizing arm 51, respectively, are moved in a rearward direction, while the connection 47 for the draft arm 26a is moved forwardly or in a reversed direction. Since the swivel connections on the tractor rear axle 16 for the draft arms 26 and 26a, and stabilizing arm 51 are stationary, and in linear alignment transversely of the tractor, the stabilizing arm 51 functions as an actuating arm to move the complete plow structure toward the left, as viewed in Fig. 1, or toward the furrow wall to compensate for the movement of the connections 47, 49 and 56 in response to the rocking movement of the rock arms 38 and 39. This steering action on the plow structure 20 by the complementary action of the arms 26, 26a and 51, and rocker shaft assembly, provides for an effective steering of the tractor 15 by virtue of the reduction of the tendency of the plow side thrust to steer the tractor in short radius turns.

Figure 5:
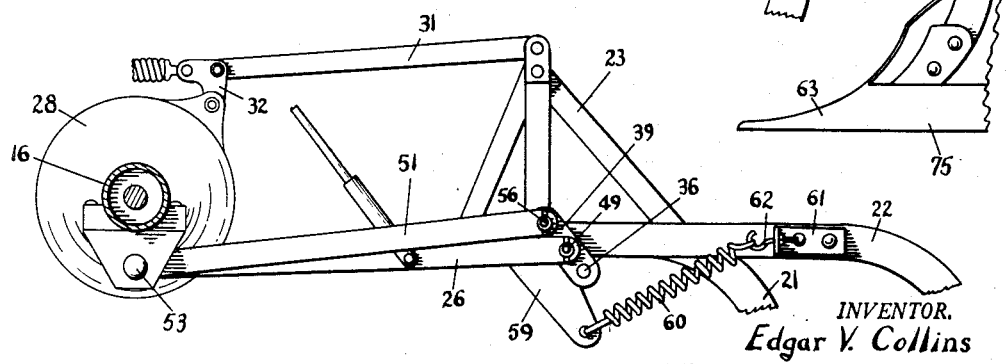
Fig. 5 is a side elevational view of the plow hitch illustrated similarly to Fig. 4 and showing parts thereof in changed positions.

For a righthand turn of the tractor 15 the rear ends of the draft arms 26 and 26a, and stabilizing arm 51 are shifted transversely of the tractor 15 in the direction of the righthand turn, from their full lines shown in Fig. 3 to their dotted line positions shown in the same figure and indicated at C, to in turn move or steer the plow structure 20 so that it points toward the left hand side of the tractor as indicated at C by the plow beam 22 in Fig. 3. For this movement of the draft arms 26 and 26a and stabilizing arm 51, the rocker arm 39 is moved in a counterclockwise direction from its position shown in Fig. 1, to its position shown in Fig. 5. The steering movement of the plow structure 20 in a direction toward the furrow wall, during a right hand turn of the tractor, is thus effected by the actuating action of the stabilizing arm 51, to swing the plow structure 20 in response to the reversed movements of the rock arms 38 and 39 and the draft arms 26a and 26, respectively. Referring to Fig. 5 it is seen that the tension in the spring 60 is reduced concurrently with an increase in the effective turning movement of the extension arm 59 relative to the axis of the rock shaft 36 whereby to maintain substantially uniform the pressure of the spring 60 applied on the rock shaft 36.

With the steering movement of the plow structure 20 towards the left, as viewed in Fig. 1, or toward the furrow wall, for a righthand turn, the width of the cut taken by the plows 63 is maintained substantially the same relative to the width when the tractor 15 is operating in a straight line path. Thus, without the plow hitch of this invention, for a righthand turn the plow structure would tend ot move away from the furrow wall so as to take a narrow cut relative to the cut taken for a straight line advance of the tractor. Further, the tractor is capable of being operated through a shorter turning radius since the plow structure 20 is maintained in a following relation with the tractor during the righthand turn.

The modified form of the invention shown in Figs. 6–10, inclusive, is similar in many respects to the plow hitch shown in Fig. 1 but additionally provides for a control of the suction action of the plow whereby a furrow of substantially uniform depth is maintained for a travel of the tractor over an uneven ground surface.

Similar numerals of reference will be used, therefore, to designate like parts.

Figure 6:
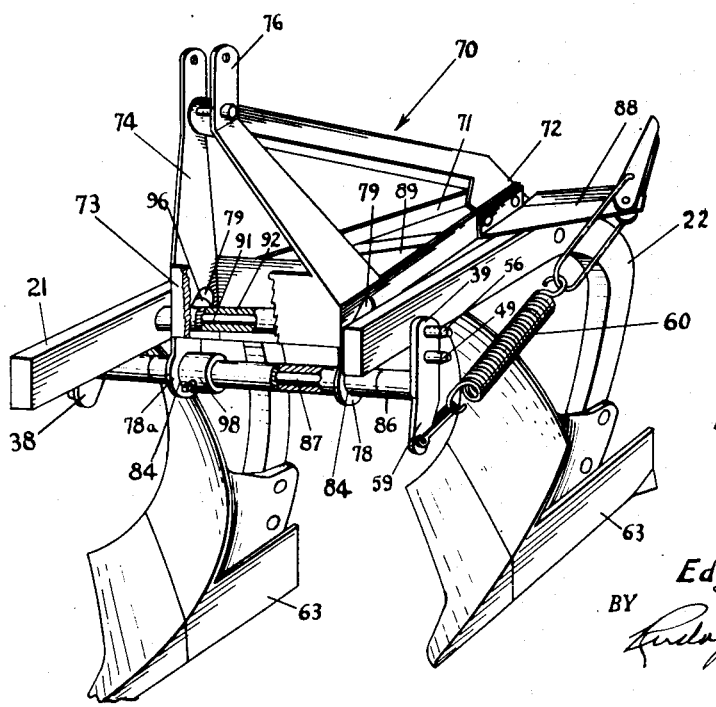
Fig. 6 is a perspective view of a modified form of the plow hitch of this invention with certain parts broken away for the purpose of clarity.

With reference to Fig. 6 the modified form is shown as including what will be termed a hanger structure 70 having a triangular horizontal frame 71 with its apex 72 at the rear end thereof and its base member 73 at the front end thereof. An upright frame 74 extended upwardly from the base 73 has its top end 76 pivotally connected, as shown in Fig. 8, with a top link 77 which is associated with a Ford power lift 24 in all respects similar to the top link 31 shown in Fig. 1.

Figure 7:
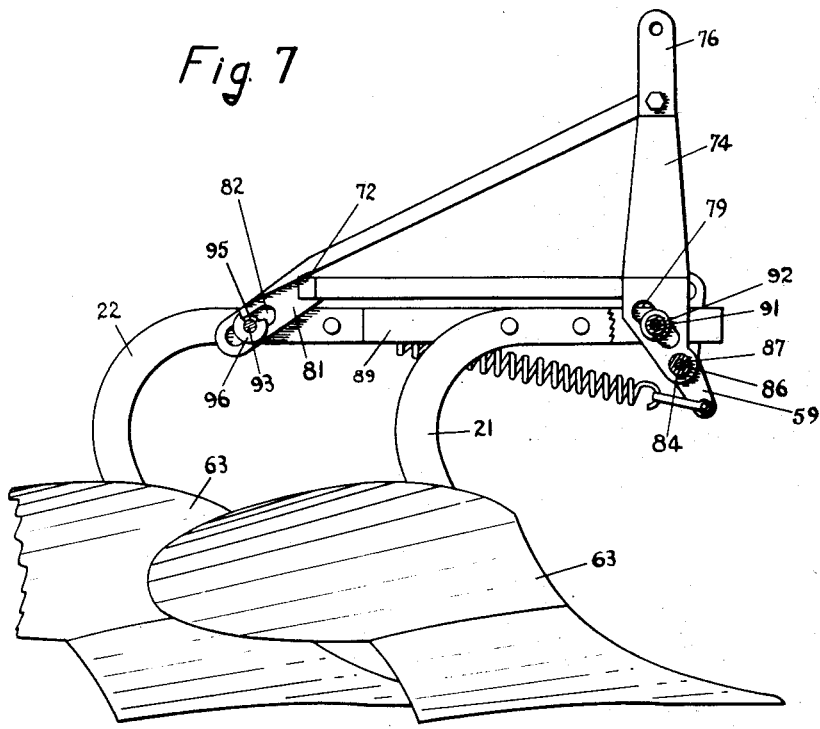
Fig. 7 is a side elevational view of the plow hitch shown in Fig. 6.

The base member 73 is provided at its opposite ends with a pair of downwardly projected bearing straps or arms 78 and 78a which are formed with transversely aligned arcuate slots 79 for a purpose which will appear later. As shown in Figs. 7 and 10 the apex 72 of the frame 71 terminates in a downwardly and rearwardly projected bearing arm extension 81 that is formed with an arcuate slot 82 which is reversely inclined relative to the aligned slots 79 formed in the bearing arms 78 and 78a. The free or lower ends of the front bearing arms 78 and 78a are formed with transversely aligned holes 84 for rotatably receiving a tubular bearing 86 (Fig. 6).

A rock shaft 87 extended through the bearing sleeve 86 has secured to its opposite ends rock arms 38 and 39 which are arranged in all respects similar to the rock arms 38 and 39 for the rock shaft 36 described in Fig. 1. Further, and similarly to the plow hitch shown in Fig. 1, the draft arm 26a is pivotally connected to the free end of the rock arm 38, and the draft arm 26 and stabilizing arm 51 are pivoted on the pins 49 and 56, respectively, provided on the rock arm 39. The tension spring 60 (Fig. 6) has its front end connected to the rock arm extension 59 and its rear end connected to a bracket 88 projected laterally from the apex 72 of the horizontal frame 71 of the hanger structure 70. The plow beams 21 and 22 are inter-connected adjacent their rear ends by a brace member 89 and adjacent their front ends by a tie rod 91 (Figs. 6 and 7). Mounted about the tie rod 91 is a roller tube 92.

As best appears in Fig. 6 the plow beams 21 and 22 are arranged at opposite sides of the hanger structure 70 with the tie rod 91 and roller tube 92 extended through the arcuate slots 79 formed in the bearing arms 78 and 78a. Positioned within the arcuate slot 82, formed in the rear extension 81 of the frame 71, is a roller 95 which is carried on a stub shaft 93 mounted on the plow beam 22 at a position adjacent the rear end thereof. Each of the rollers 92 and 95 has associated thrust washers 96 which are engageable with the left sides of the arm 78a and rear extension arm 81, respectively, as viewed in Fig. 6, or with the front sides of these arms as viewed in Fig. 7. Likewise, a thrust collar 98 is fixed to the tubular bearing 86 for engagement with the right side of the arm 78a as viewed in Fig. 6. This arrangement of the thrust washers 96 and thrust collar 98 counteracts the action of the spring 60 to pull the plows 63 toward the left, as viewed in Fig. 6.

The operation of the plow hitch of Fig. 6 for accomplishing a short radius turn of the tractor during a plowing operation, with a maintaining of a substantially uniform furrow width, is similar in all respects to such operation previously described in connection with Fig. 1. A further description of this operation thus is believed to be unnecessary.

In the operation of the modified form of the hitch shown in Fig. 6 for controlling the suction action of the plows 63 for a travel of the tractor over an uneven ground surface it will be noticed from Figs. 7 and 10 that the arcuate slots 79 and 82 are reversely inclined, namely, the front slots 79 are inclined upwardly and rearwardly, while the rear slot 82 is inclined downwardly, and rearwardly. The inclination of the slots 79 and 82 are empirically developed on the theory that the hypothetical point of application of the pulling force on the plows 63 for a straight line pull without any suction action, takes place at the point indicated at 99, in Fig. 10, located centrally between the plows 63 and constituting a common center for the slots 79 and 82.

The slot 82 in one embodiment of the invention, is formed on a radius of twenty-four and five-sixteenths inches, while the slots 79 are formed on a radius of twenty-three inches. In this embodiment the point 99 is located seventeen and one-half inches downwardly from the lower side of the horizontal frame 71.

In the operation of the depth or suction control for the plows 63, when the tractor 15 is travelling over level ground the rollers 92 and 95 are located substantially intermediate the ends of their respective slots 79 and 82 as shown in Fig. 10. Should the tractor front wheels 101 (Fig. 9) drop within a depression, indicated at 102, the frame 70 is moved clockwise relative to a transverse axis through the point 99 so that the roller 95 is located at the lower end of the slot 82 and the roller 92 at the upper ends of the slots 79 whereby the suction of the plows 63 remains unchanged to thus maintain the depth of the furrow, indicated at 103, uniform. In other words, the frame 70 is moved relative to the plows.

When the tractor rear wheels 65 drop into the depression 102, as illustrated in Fig. 8, the frame 70 is rotated in a counterclockwise direction about a transverse axis through the point 99 so that the roller 95 takes a position at the upper end of the slot 82 and the roller 92 a position at the lower ends of the slots 79, with this action again resulting in no change in the suction action of the plows 63.

This movement of the frame 70 relative to the plows eliminates any stepping or chattering action of the plows 63 by acting to maintain the plows in adjusted suction positions and against any tipping movement in response to a travel of the tractor over uneven ground surfaces.

Although the invention has been described with specific reference to a plow, it is to be understood that it can be used with any farm implement of trailing type having a ground working tool thereon, such as a planter, cultivator, lister or disc.

It is to be further understood that although the invention has been described with respect to several embodiments thereof, it is not to be so limited since changes can be made therein which are within the full intended scope of this invention as defined by the appended claims.

I claim:

1. A plow attachment for a tractor having a rear axle, comprising a plow frame structure located rearwardly of said axle and movably supported from said tractor for up and down and transverse swinging movement, a transverse rock shaft carried adjacent the front end of said frame, a pair of rock arms mounted on said rock shaft in an axially spaced relation, with said rock arms being extended in opposite directions laterally of said shaft, a third rock arm on said shaft, a pair of oppositely arranged, transversely spaced connecting arms movably connected to said pair of rock arms and to said axle, a stabilizing arm movably connected to one of said rock arms and to said axle at a position spaced outwardly from the connection with said axle of the connecting arm corresponding to said one rock arm, and yieldable means connected at one end to said third rock arm and at its opposite end to said frame at a position rearwardly of said rock shaft.

2. A plow attachment for a tractor having a rear axle, including a plow-carrying frame located rearwardly of said axle and supported from said tractor for up and down and transverse swinging movement, a transverse rock shaft on said frame having a pair of axially spaced rock arms projected laterally in opposite directions therefrom, connecting arms corresponding to said rock arms, means movably connecting said connecting arms to said axle and to said rock arms, a stabilizing arm movably connected to said axle and to one of said rock arms, and means for yieldably urging said shaft in one direction of rotation therefor.

3. A plow attachment for a tractor having a rear axle including a plow-carrying frame supported from said tractor for up and down and transverse swinging movement rearwardly of said axle, a transverse rock shaft carried adjacent the front end of said frame, a pair of axially spaced rock arms on said shaft projected laterally in opposite directions from said shaft, a pair of draft arms corresponding to said rock arms movably connected to said axle and to said rock arms at positions spaced substantially equal distances laterally from the axis of said rock shaft, a stabilizing arm movably connected to one of said rock arms at a position spaced laterally outwardly from the connection therewith of a corresponding draft arm, and to said axle at a position spaced outwardly from the connection with the axle of said corresponding draft arm, and means for yieldably urging said shaft in one direction of rotation therefor.

4. A plow attachment for a tractor having a rear axle including a plow-carrying frame supported from said tractor at a position rearwardly of said axle, a transverse rock shaft carried adjacent the front end of said frame having a pair of longitudinally spaced rock arms arranged at substantially equal distances to opposite sides of the longitudinal center line of said frame, a pair of longitudinally extended draft arms of substantially equal lengths, corresponding to said rock arms, and having their rear ends movably connected to said rock arms and the front ends thereof movably connected to said axle, with the connections of said draft arms to said axle being at substantially equal distances from opposite sides of said longitudinal center line, and a stabilizing arm movably connected to said axle and to one of said rock arms.

5. A plow attachment for a tractor having a rear axle including a frame for carrying a ground working tool, a transversely extended rockable unit on said frame having laterally extended arms, a hitch means movably connected to said tractor and to said arms, a stabilizing member movably connected to said tractor and to one of said arms for rocking said rockable unit, and means for yieldably urging said rockable unit in one direction of rotation therefor such that the pressure of said yieldable means on said rockable unit is substantially constant for any moved position of said rockable unit.

6. In a pull attachment for a tractor including a frame for carrying a ground working tool rearwardly of the tractor, a transversely extended rockable unit mounted on said frame having a pair of oppositely extended lateral arms, a pair of draft arms movably connected to the tractor and to said pair of lateral arms, an actuating arm member movably connected to said tractor and to one of said lateral arms such that the connection at the rear end of said actuating arm is vertically disposed from the axis of said rockable unit when the attachment is in a straight pull position therefor, yieldable means for urging said rockable unit in one direction of rotation thereof, and means for maintaining the pressure of said yieldable means on said rockable unit substantially constant for any moved position of said rockable unit.

7. A pull attachment for a tractor including a frame for carrying a ground working tool rearwardly of the tractor, a transversely extended rockable means on said frame having a pair of rock arms thereon, a hitch means including a pair of draft arms of the same length having the front ends thereof movably connected to said tractor and the rear ends thereof movably connected to said pair of rock arms, and a stabilizing arm of a different length than said draft arms movably connected at the front end thereof to the tractor and having the rear end thereof movably connected to one of said rock arms, with the connections at the front ends of said draft arms and at the front end of said stabilizing arm being in linear alignment transversely of the tractor, and said one rock arm being in an upright position when the attachment is in a straight pull position therefor.

8. In combination with a tractor, a frame for carrying a ground working tool rearwardly of the tractor, a transversely extended rockable means on said frame having a pair of rock arms thereon, means for swinging said frame transversely of the tractor during a turning movement thereof such that the frame is swung toward the tractor side which is on the inside of the turn including a pair of oppositely arranged draft arms of a like length movably connected to the tractor and to said pair of rock arms and an actuating arm movably connected to the tractor and to one of said rock arms such that when the attachment is in a straight pull position therefor, said one rock arm is in a substantially upright position, with the connections of said pair of draft arms and of said actuating arm with the tractor being in alignment transversely of the tractor, said means for swinging said frame also including means acting on said rockable means to maintain a substantially uniform and unidirectional turning pressure thereon at any moved position therefor.

9. In combination with a tractor including a frame for carrying a ground working tool, a hitch means for connecting said frame to the tractor including a pair of transversely spaced draft arms, a transversely extended rock shaft on said frame having a pair of axially spaced rock arms extended in opposite directions laterally therefrom, means movably connecting the rear ends of said draft arms to said rock arms, other means movably connecting the front ends of said draft arms to the tractor, with said draft arms being disposed in equi-distant lateral relation to and on either side of the central draft plane of the tractor, and a stabilizing arm movably connected at one end to the tractor and at its opposite end to one of said rock arms, with the connections of said draft arms and stabilizing arm with the tractor being in alignment transversely of the tractor.

10. In combination with a ground working implement to be pulled by a tractor having a main frame supported on the tractor for up and down and transverse swinging movement, a transversely extended shaft on said frame having a pair of axially spaced rock arms mounted thereon, with said rock arms being extended laterally in opposite directions from said shaft, a third rock arm on said shaft, a pair of longitudinally extended draft arms having the corresponding ends thereof movably connected respectively to said tractor and to said pair of rock arms to permit up and down movement and limited transverse movement of said frame, a stabilizing arm having one end movably connected to one of said rock arms and its opposite end movably connected to the tractor, with the connections of said stabilizing arm and draft arms with the tractor being in linear alignment transversely of the tractor, and spring means connected to said third arm and to said frame to maintain a uni-directional yieldable pressure on said rock shaft.

EDGAR V. COLLINS.

References Cited in the file of this patent
UNITED STATES PATENTS

| Number | Name | Date |
| --- | --- | --- |
| 1,877,958 | Pawl | Sept. 20, 1932 |
| 2,223,002 | Ferguson | Nov. 26, 1940 |
| 2,296,209 | Kriegbaum et al. | Sept. 15, 1945 |
| 2,379,225 | Fraga | June 26, 1945 |
| 2,530,565 | Briscoe | Nov. 21, 1950 |